United States Patent [19]

Smith et al.

[11] 3,953,278

[45] Apr. 27, 1976

[54] STICKER APPLICATOR

[75] Inventors: Gary L. Smith, Hickory; Walter T. Cockrell, Newton, both of N.C.

[73] Assignee: J. P. Stevens & Co., Inc., New York, N.Y.

[22] Filed: Nov. 4, 1974

[21] Appl. No.: 520,719

[52] U.S. Cl. .............................. 156/361; 156/541; 156/584; 221/73; 226/162

[51] Int. Cl.² ...................... B32B 31/00; B65N 5/28

[58] Field of Search .................... 156/361, 540–542, 156/584; 226/162; 221/71, 72, 73

[56] References Cited

UNITED STATES PATENTS

| | | | |
|---|---|---|---|
| 3,038,645 | 6/1962 | Nordlof | 226/162 |
| 3,169,895 | 2/1965 | Sohn | 156/361 |
| 3,321,105 | 5/1967 | Marano | 221/73 |
| 3,741,458 | 6/1973 | Aylesworth | 226/162 |
| 3,793,114 | 2/1974 | Thomas | 156/361 |
| 3,814,651 | 6/1974 | Wada | 156/584 |

*Primary Examiner*—Douglas J. Drummond
*Attorney, Agent, or Firm*—Leitner, Palan & Martin

[57] ABSTRACT

A device for dispensing and applying stickers by intermittently engaging and advancing a continuous strip carrying said stickers along a path having an abrupt change of direction which causes the stickers to separate from the strip. A mobile clamp intermittently engages the strip and travels a reciprocal path for incrementally advancing the continuous strip to dispense a sticker.

7 Claims, 5 Drawing Figures

STICKER APPLICATOR

BACKGROUND OF THE INVENTION

1. Field of the Invention

The present invention relates generally to dispensers and more specifically to a dispenser which dispenses and applies a sticker to an article.

2. Description of the Prior Art

In the field of sticker dispensers and applicators, a sticker is carried by a paper carrier or backing from which it is removed and stuck into its permanent location. The general dispensers of the prior art have dispensed stickers which are separate from each other along the lateral surface of the carrier. A small sensing finger has been used to determine the rear edge of the sticker by the open space between two stickers. The sensing finger is raised to allow advancement of a sticker and turns off the advancement control when the space between the stickers is sensed. Though this method of dispensing and applying has been successful in the past, it has not been able to dispense and apply butt cut stickers. As is well known, butt cut stickers are not spaced from each other and therefore the mechanism to sense the rear edge of the individual stickers has no place at which it may contact the rear edge of the butt cut series of stickers.

To dispense butt cut stickers, the prior art has used various intricate mechanical mechanisms. To date, the most effective and economical means of separating the sticker from the carrier or backing has been to guide the carrier around an edge. The rigidity of the sticker is sufficient to cause the sticker to continue to travel a generally straight path while the carrier abruptly changes direction around the edge. The drive assemblies are usually a set of rollers which continuously engage the carrier and are intermittently driven to advance the carrier. Motor controlled rollers increase the size and cost of the dispenser. Adjustment of the drive for various size stickers is unduly complicated, if available at all.

SUMMARY OF THE INVENTION

The present dispenser and applicator provides an improved drive mechanism which overcomes the problems of the prior art. A mobile clamp is slidably secured to a base for reciprocal movement and intermittently engages the carrier or backing upon which the sticker is detachably mounted. Controls are provided for advancing the backing by closing the mobile clamp during the advance segment of the reciprocal movement and opening the mobile clamp during the return segment of the reciprocal movement. A stationary clamp is provided to hold the backing stationary during the return segment of the reciprocal movement. A sensor is mounted in the path of the article to which the sticker is to be applied to detect the presence of the object and initiates the advance segment of the reciprocal movement.

OBJECTS OF THE INVENTION

An object of the present invention is to provide a device which will dispense and apply butt cut stickers.

Another object is to provide an improved drive mechanism for a sticker dispenser device which intermittently engages the carrier of the sticker to advance a single sticker.

A further object of the present invention is to provide an inexpensive and reliable sticker dispenser and applicator.

Other objects, advantages and novel features of the present invention will become apparent from the following detailed description of the invention when considered in conjunction with the accompanying drawings.

BRIEF DESCRIPTION OF THE PREFERRED EMBODIMENTS

Figure 1:
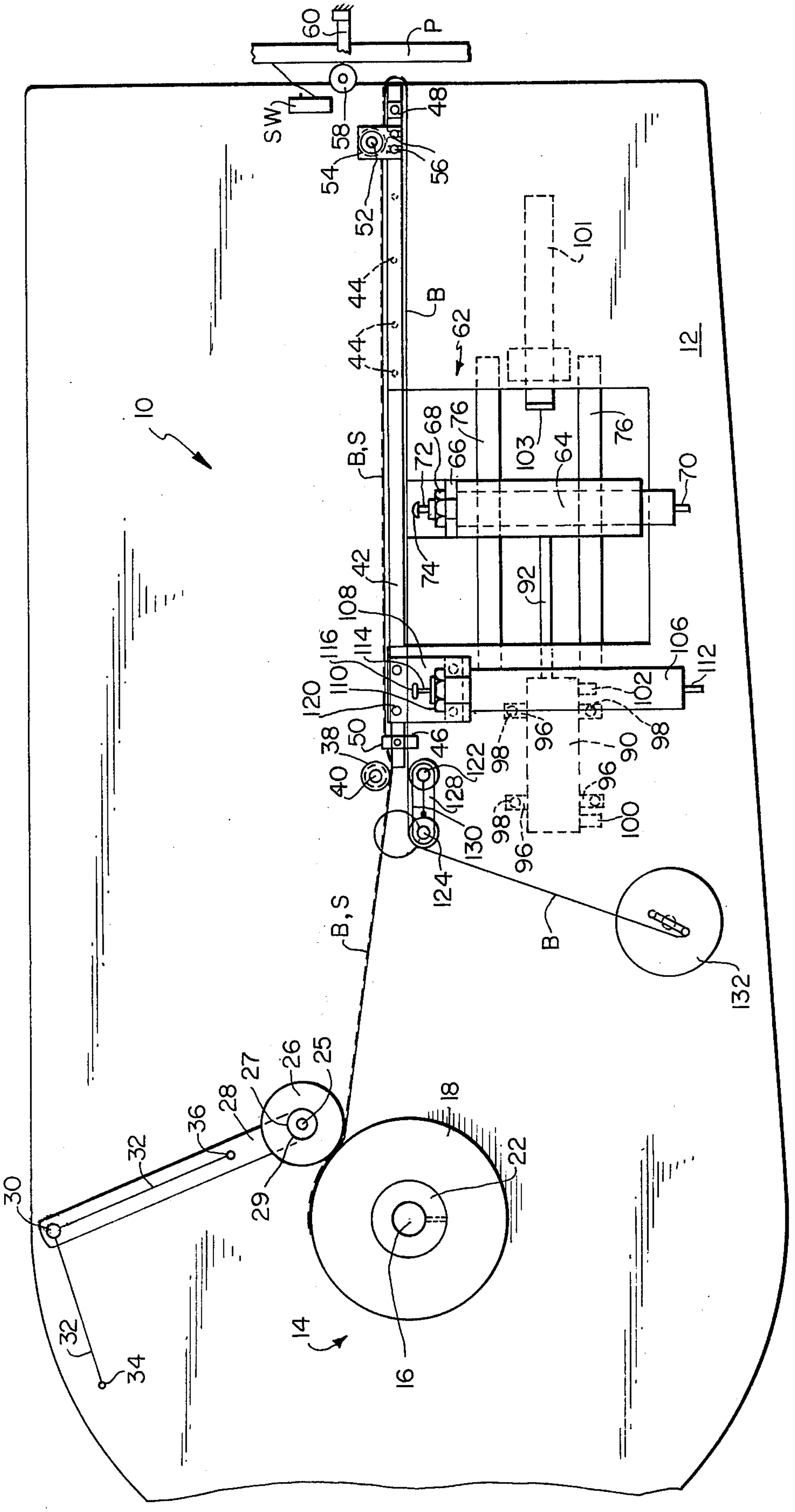
FIG. 1 is a top view of a preferred embodiment of the subject invention.

As illustrated in FIG. 1, the sticker dispenser and applicator 10 of the present invention includes a base member 12. Rotatably mounted to the base 12 is a spindle 14 upon which the roll of stickers to be dispensed and applied is mounted. As shown specifically in FIG. 2, the spindle 14 includes a center shaft 16 which is secured to the base 12 and a spindle base 18. A biasing means, for example, a compression spring 20, is secured between collars 22 and 24. Element 22 is secured to the shaft 16 and element 24 is slidably received on shaft 16. The biasing means exerts a force on spindle base 18 to resist totally free rotation of the spindle.

Also mounted to base member 12 by pin 30 is an arm 28 having a tension roller 26 which is rotatably mounted thereon by a pin 25, collar 27 and compression spring 29 (not shown). A spring 32 is wrapped around pin 30 and secured to base member 12 at 34 and to the arm 28 at 36. The spring 32 causes the tension roller 26 to ride on the exterior of the tape of the sticker supply roll and controls the unreeling of the sticker and its carrier. It should be noted that the parallel solid and dotted line starting at the exterior of the spindle 14 represents the path of the backing material B and the stickers S, respectively. The stickers S, though generally having printed information thereon, may be any material having adhesive on one surface, for example, adhesive tape.

Upon leaving the spindle 14, the sticker and its backing material is received by a roller 38 which is secured to the base member 12 by a pin 40. The backing material travels the majority of its course against a guide plate 42 which is secured to the base 12 by fasteners 44. At the ends of guide 42 are two slots 46 and 48, as shown more specifically in FIG. 2. In slots 46 and 48 are adjustable guide pins 50. The backing material B runs between the base 12 at its bottom and the adjustable pins 50 at its top. At the other end of the guide plate 42 is a roller 52 which is mounted between brackets 54. The brackets 54 are secured to the base 12 and the guide 42 by fasteners 56.

Figure 4:
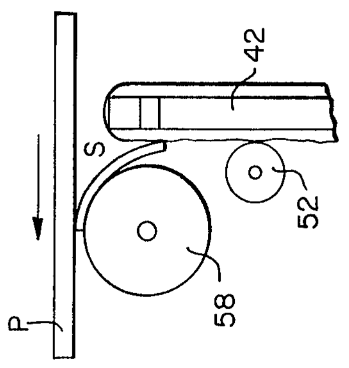
FIG. 4 is a top enlarged view of the sticker being applied.

As the backing B abruptly changes its direction of travel around the front edge of guide 42, the sticker S (because of its rigidity and because of its being held slidably secure against the guide plate 42 by roller 52) travels a straight course so as to intersect with package P to which it is to be applied. The movement of the package P causes the advance end of the sticker to deflect and follow the path of the package. A compression roller 58 receives the advance end of the sticker S and compresses it against the package so as to permanently affix it thereto, as shown in detail in FIG. 4. The roller 58 is supported by bracket 60 secured to the machine which transports the package P or the base. Although the adhesive on the sticker is generally sufficient to cause the sticker to adhere to the package P by the impact of the intersection of their respective paths of travel, compression roller 58 may be located close enough to the end of the guide 42 so that the sticker is compressed between the package P and the compression roller 58 before it is disconnected to totally free from the backing B, as illustrated in FIG. 4. As will be more fully explained in the description of FIG. 5, a microswitch SW activates the dispenser and applicator system by sensing the presence of the package P by its feeler.

The backing B next encounters the transport mechanism 62, which includes a mobile clamping means 64 mounted in a carriage 66 and secured thereto by a fastening bolt 68. The mobile clamping means 64 is a cylinder having a pneumatic input 70 and a rod 72. Secured to the end of rod 72 is an elastomeric tip 72 which secures the backing material B against a portion of the carriage 66, as will be explained later. The cylinder 64 includes a solenoid valve with a spring return. The carriage 66 rides on two rails 76 which are secured to the base. Although mobile clamping means 64 is illustrated as a pneumatic cylinder, other clamping means (for example, solenoids) may be used.

Figure 3:
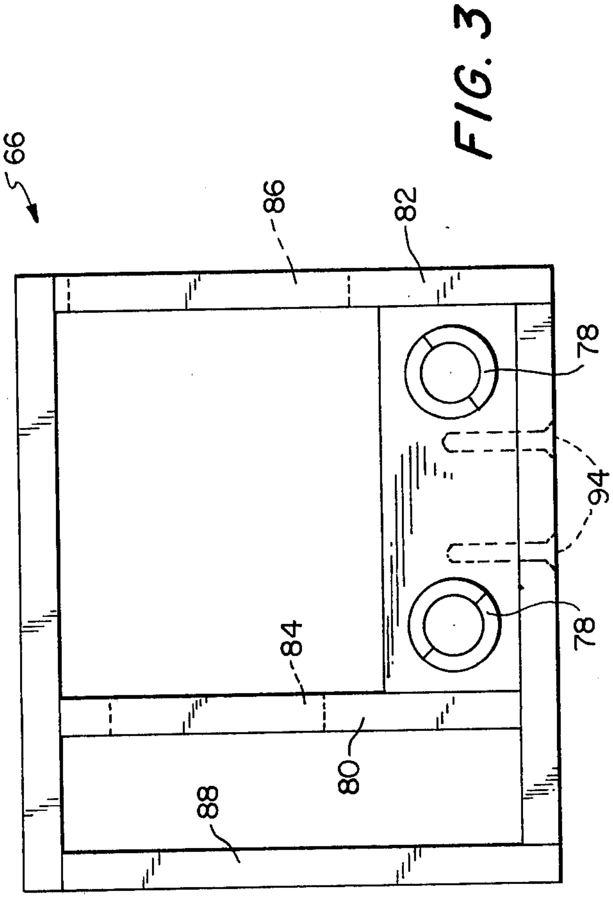
FIG. 3 is a side view of the cylinder carriage.

As shown explicitly in FIG. 3, the carriage 66 has two bearing surfaces 78 therein which receive the rails 76. A center and rear wall 80 and 82, respectively, contain apertures 84 and 86 to receive the cylinder 64. The front wall 88 of the carriage 66 comprises the one part of the clamp in combination with the elastomeric tip 74 of the cylinder. Backing material B is received between the front wall 88 and the tip 74 to be clamped therebetween.

Figure 2:
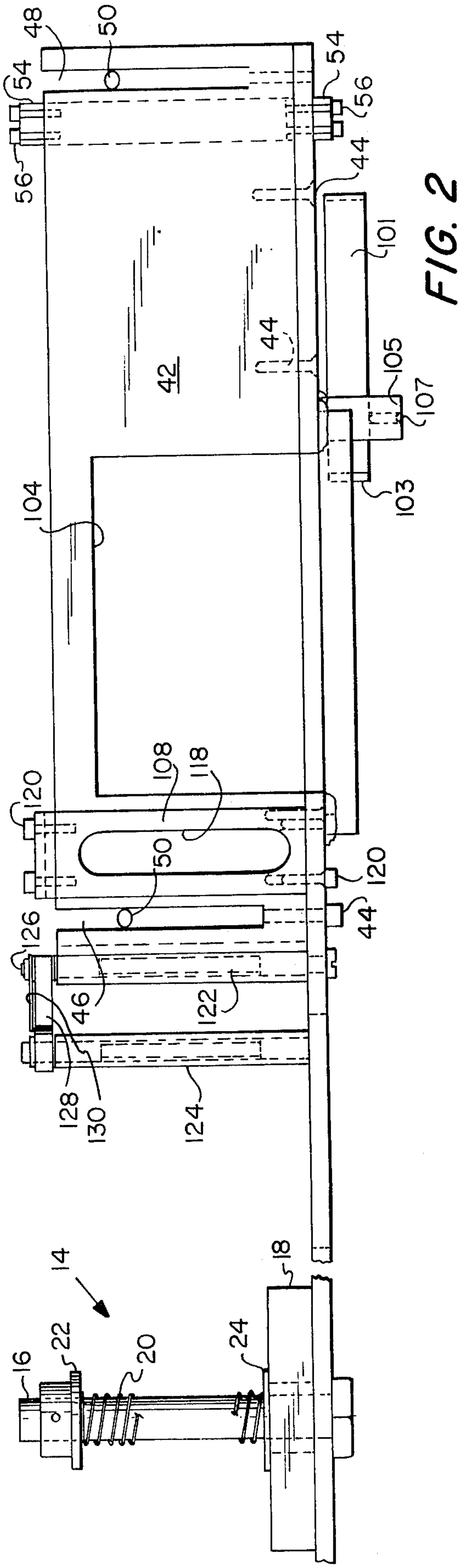
FIG. 2 is a side view of FIG. 1 with some of the elements missing for clarity.

The carriage 66 is driven by a cylinder 90 which is connected to the carriage 66 by rod 92. Apertures 94 in the carriage, as shown in FIG. 3, receive fasteners to secure a bracket (not shown) to secure the rod 92 to the carriage 66. The cylinder 90 is mounted to the bottom of the support base 12 by brackets 96 and fasteners 98. The cylinder 90 has two ports 100 and 102 so that the cylinder may be positively driven in the forward and reverse direction. As shown in FIG. 2, an opening 104 is provided in guide 42 for the front wall 88 of the carriage 66.

A stop 101 having an elastomeric tip 103 is mounted to base 12 by a bracket 105. This stop 101 is threadably received in bracket 105 and is adjustable by rotation. Once adjusted, the stop 101 is locked by a threaded pin 107. The stop 101 is adjusted to define the limit of the travel of the carriage 66 to coincide with the length of the sticker (and the space between stickers if non-butt cut stickers). Thus the length of travel of the carriage coincides with the length of the sticker as defined by the stop 101 and is easily adjustable.

A stationary clamping means 106 is mounted in a bracket 108 by bolt 110. The stationary clamping means 106 is a cylinder having an inlet 112 and a rod 114 with an elastomeric tip 116. The cylinder 106 is similar to cylinder 64 in that it includes a solenoid valve with a spring return. As shown in FIG. 2, bracket 108 has an opening 118 to receive the cylinder 106 and the bracket is secured to the base member 12 and the guide 42 by fasteners 120. Cylinder 106 clamps the backing B between the guide 42 and elastomeric tip 116. As noted, for mobile clamping means 64, a stationary clamping means 106 may also be a solenoid.

Following stationary clamp 106 is a stationary roller 122 and a swinging tension roller 124. Roller 122 is mounted to the support 12 by a pin 126. The tension roller 124 is connected to pin 126 by an arm 128 and a spring 130. Tension roller 124 rotates against the spring 130 so as to provide a tension to compensate for any slack of the backing material between the advancing mechanism and the take-up mechanism.

The backing material B is collected by a take-up spindle 132. The spindle is connected to a motor (not shown) by a magnetic clutch or magnetic friction bearing (not shown). The motor is constantly driven and the rotation is transmitted to the take-up spindle 132 by the magnetic clutch. When the backing material B is clamped to support 42 by the stationary clamp 106, the take-up spindle 132 has sufficient tension on it to overcome the magnetic clutch and thus is stationary. Once stationary, clamp 106 releases the backing material and it is free to move and be advanced by the motion of mobile clamp 64, the magnetic clutch reconnects the drive of the motor and the spindle 132 to rotate the spindle to take up the backing material B. The take-up spindle 132 also takes up the slack or compensates for the differential tension on the backing material B produced by the mobile clamping means 64 pushing the backing material towards the take-up spindle 132.

Figure 5:
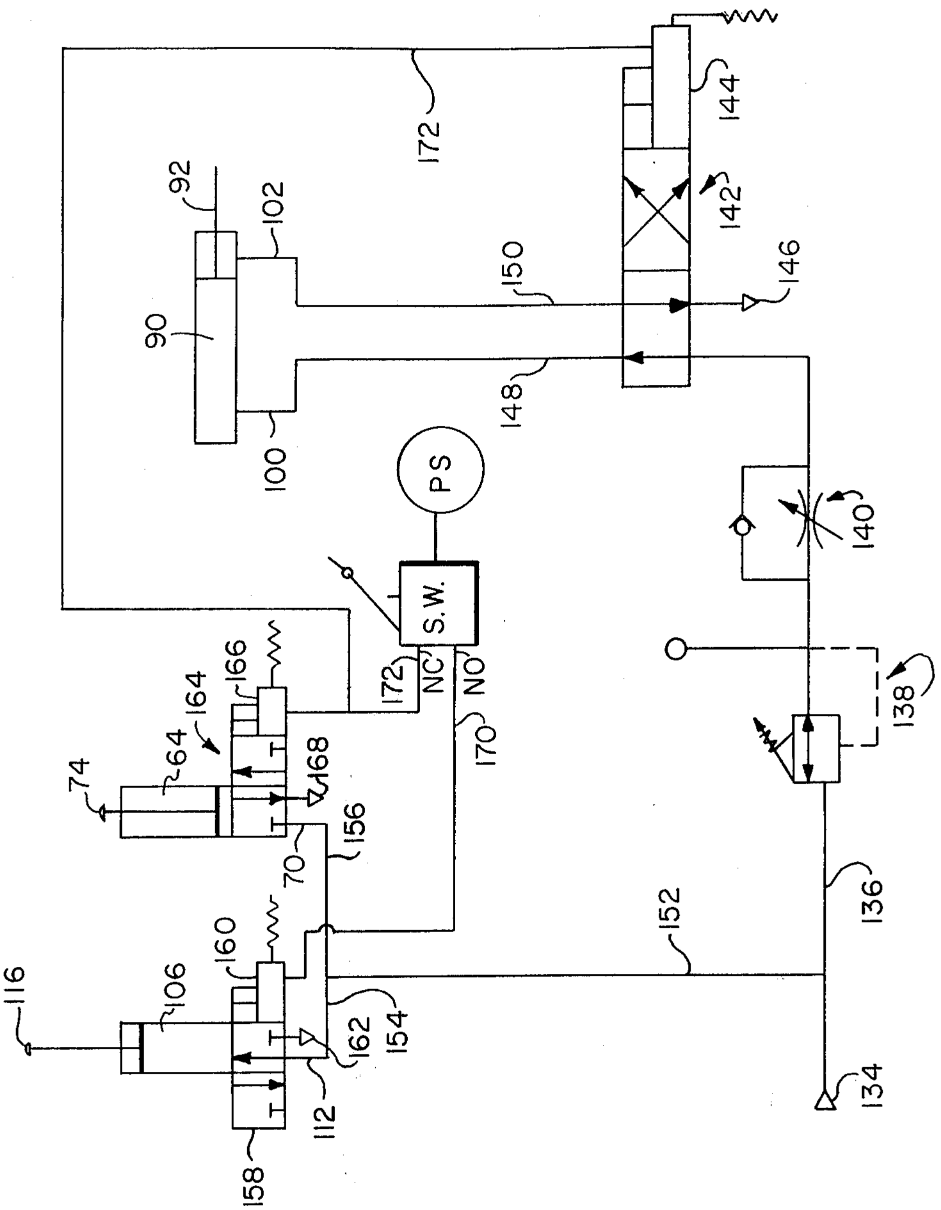
FIG. 5 is a combined electrical and pneumatic schematic.

The combined electrical pneumatic schematic as shown in FIG. 5 has a pneumatic input 134. A pressure regulator 138 and flow regulator 140 are connected to the input 134 by line 136. A four-way valve 142 having solenoid control 144 and exhaust port 146 connects the regulated flow to ports 102 and 100 of drive cylinder 90 by lines 148 and 150, respectively. Also connected to input 134 by a T-connection is line 152. A second T-connection having branches 154 and 156 connects the line 152 to the inputs 112 and 70, respectively, of valves 158 and 164. The valves are an integral part of the cylinders 106 and 64. Valve 158 has a solenoid control 160 and an exhaust port 162 and valve 164 has a solenoid control 166 and exhaust port 168.

The electrical portion of the schematic includes a power supply PS and the microswitch SW. The normally open lead of SW is connected to activate solenoid 160 of valve 158 by lead 170. The normally closed lead of SW is connected to solenoids 166 and 144 of valves 164 and 142, respectively, by lead 172. As illustrated in FIG. 5, solenoid 160 is activated to pressurize and extend tip 116 and solenoids 166 and 144 are deactivated to exhaust and retract tip 74 and to pressurize and extend rod 92, respectively. This is the initial position of the system.

OPERATION

The dispenser/applicator is initially set up having the backing material B threaded along the path shown in FIG. 1. A package P moving down a given line intersects microswitch SW. Prior to the closing of the microswitch SW, the pneumatic controls (for example, valves 142, 158 and 164) are in the position shown in FIG. 5. This condition has port 100 connected to the supply so as to extend rod 92 to force the carriage 66 forward against stop 103. The normally open lead of the microswitch activates valve 158 to connect the input 134 to valve 158 which extends tip 116 to clamp the backing B against the guide 42.

Once the microswitch is closed, the power is supplied to solenoid 166 which is activated to change the valve 164 to pressurized cylinder 64 and extend tip 74. This clamps the backing B against the front wall 88 of the carriage. Simultaneously, solenoid 144 is activated to change the valve 142 to connect port 102 to the supply and vent port 100. This causes cylinder 90 to pull the carriage 66 from right to left in FIG. 1 after tip 74 clamps the backing B and thereby advancing the backing B and dispensing a sticker S. Also simultaneously, solenoid 160 is deactivated and the spring returns the valve to the position which retracts the extended tip 116 and unclamps the backing. The movement of the activated mobile clamp 64 advances the backing. The tension is maintained on the backing B by tension roller 124 to take up any slack due to the opening or closing and/or travel of clamp 64 and 106. As previously explained, the sticker S tends to travel straight whereas the backing B turns a corner around guide 42. The sticker S intersects the travelling package P and moves therewith between the compression roller 58 and package P.

Once the package P, with the sticker S thereon, has completed its travel past the microswitch SW, the switch SW opens, deactivating solenoid 142 which returns to the position shown in FIG. 5 so as to pressurize the port 100 so that cylinder 90 returns the carriage to the rightmost position as shown in FIG. 1. Simultaneously, solenoid 166 is also deactivated to allow valve 164 to return to the position shown in FIG. 5, deactivating mobile clamp 64. Also, solenoid 160 is activated to change valve 158 to activate the stationary clamp 106. Thus, the cycle is complete and awaits the presence of another package P to trip the switch SW to reinitialize the cycle to advance the backing by linear reciprocal movement.

Although the preferred embodiment has been described as a combined dispenser and applicator for attaching stickers to a moving package, it is obvious that the same system may be used as a dispenser only or in combination with other applicators, depending upon the object to which the sticker is to be attached. Similarly, the present device may be used as a tape dispenser automatically or manually controlled by the switch SW. From the preceding description of the preferred embodiments, it is evident that the objects of the invention are attained. The spirit and scope of this invention are limited only by the terms of the appended claims.

What is claimed:

1. An applicator for applying a sticker or other material having an adhesive on at least one surface releasably mounted to a continuous backing strip to an object comprising:

support means;

guide means mounted to said support means for directing said strip from a source of supply along a first path past said object, said guide means causing said sticker to separate from said strip and travel a second path by abruptly changing the first path of said strip at said object, said object moving along a third path and said sticker in said second path intersects said object in said third path;

a take-up means mounted to said support means for reeling said backing strip after said stickers have been detached;

a stationary clamp means mounted to said support means between said abrupt change in said first path and said take-up means;

a mobile clamp means slidably mounted to said support means between said abrupt change in said first path and said take-up means for intermittently engaging said backing strip and drawing said backing strip past said abrupt change by reciprocal movement relative to said support means; and control means connected to said stationary and mobile clamp means for closing and advancing said mobile clamp means during the advance segment of said reciprocal movement and for closing said stationary clamp means during the return segment of said reciprocal movement to prevent said take-up means from drawing said backing strip.

2. The applicator of claim 1 including a sensor means along said third path and connected to said control means for detecting the presence of an object, said control means opens said stationary clamping means and closes and advances said mobile clamping means to engage and draw said strip once an object is detected.

3. The applicator of claim 2 wherein said control means closes said stationary clamp means to engage and maintain said strip stationary when said sensor detects absence of an object.

4. The applicator of claim 1 including a compression means for biasing said sticker in said second path against said object in said third path.

5. The applicator of claim 1 wherein said mobile clamp means is a cylinder, piston, piston rod combination mounted on a carriage, said control means includes a cylinder, piston and piston rod combination connected to said carriage for reciprocating said carriage along said first path, and said stationary clamp means is a cylinder, piston, piston rod combination mounted to said support means.

6. The applicator of claim 1 wherein said take-up means includes a take-up at the end of said first path for collecting said strip, a continuous rotating drive means and a transmission means interconnecting said drive means and said reel for rotating said reel only when said stationary clamp means disengages said strip.

7. The applicator of claim 6 wherein said transmission is a magnetic friction bearing.

* * * * *